(12) United States Patent
Wu

(10) Patent No.: US 12,472,786 B1
(45) Date of Patent: Nov. 18, 2025

(54) TRAILER CONNECTING MECHANISM AND TRAILER

(71) Applicant: Shenzhen Tuya Technology Co., Ltd., Guangdong (CN)

(72) Inventor: Dajin Wu, Guangdong (CN)

( * ) Notice: Subject to any disclaimer, the term of this patent is extended or adjusted under 35 U.S.C. 154(b) by 0 days.

(21) Appl. No.: 19/196,673

(22) Filed: May 1, 2025

(51) Int. Cl.
  *B60D 1/52* (2006.01)
  *B60D 1/02* (2006.01)
  *B60D 1/14* (2006.01)

(52) U.S. Cl.
  CPC .................. *B60D 1/52* (2013.01); *B60D 1/02* (2013.01); *B60D 1/143* (2013.01)

(58) Field of Classification Search
  CPC ............. B60D 1/52; B60D 1/02; B60D 1/143
  See application file for complete search history.

(56) References Cited

U.S. PATENT DOCUMENTS

| | | | | |
|---|---|---|---|---|
| 559,761 | A * | 5/1896 | Trancle-Armand | ........................ B62K 27/003 280/204 |
| 4,174,120 | A * | 11/1979 | Freeman | ................ B62K 27/12 280/204 |
| 4,274,649 | A * | 6/1981 | Vanderhorst | ........... B62K 27/12 280/204 |
| 5,975,549 | A * | 11/1999 | Ockenden | ................ B62J 11/05 280/204 |
| 8,814,193 | B2 * | 8/2014 | Barnes | ................... B62K 27/12 280/204 |
| 10,266,095 | B1 * | 4/2019 | Berg | ........................ B60P 3/14 |
| 10,647,379 | B1 * | 5/2020 | Dotsey | ................ B62K 27/006 |
| 2010/0135716 | A1 * | 6/2010 | Shalaby | ................ B62K 27/12 403/325 |
| 2015/0158548 | A1 * | 6/2015 | Foley | .................. B62K 27/003 280/204 |
| 2019/0300099 | A1 * | 10/2019 | Thomas | ................ B62K 27/12 |
| 2021/0061031 | A1 * | 3/2021 | Larson | .................. B60D 1/143 |

* cited by examiner

*Primary Examiner* — Valentin Neacsu
*Assistant Examiner* — Marlon A Arce
(74) *Attorney, Agent, or Firm* — Hawaii Patent Services; Nathaniel K. Fedde; Kenton N. Fedde

(57) ABSTRACT

Disclosed is a trailer connecting mechanism, including: a first connecting assembly, a connecting member movably connected to the first connecting assembly, and a second connecting assembly connected to the connecting member; and the first connecting assembly is further connected to a trailer, and the second connecting assembly is further connected to a power-assisted vehicle; and the second connecting assembly is adjustably arranged relative to the connecting member. In the trailer connecting mechanism and the trailer in the present disclosure, the second connecting assembly and the connecting member are connected through combination of a threaded structure and a fixing base, which achieves width adjustment and rotational connection between the second connecting assembly and the power-assisted vehicle. Additionally, the first connecting assembly and the connecting member are movably connected in a rotational and vertical direction, such that the power-assisted vehicle tows the trailer in a more comfortable manner.

8 Claims, 5 Drawing Sheets

TRAILER CONNECTING MECHANISM AND TRAILER

TECHNICAL FIELD

The present disclosure relates to the technical field of trailers for power-assisted vehicles, and in particular to a trailer connecting mechanism and a trailer.

BACKGROUND

With the continuous development of the camping economy, an increasing number of users prefer using small trailers to transport food and outdoor supplies. Trailers of the prior art are typically designed to be movable in a way of hand pulling by users, and some trailers can be connected to power-assisted vehicles for towing movement. However, a connection structure between a trailer of the prior art and an power-assisted vehicle is fixed, such that the connection structure of a trailer is incompatible with different types of power-assisted vehicles, which significantly reduces usability.

SUMMARY

In order to overcome the defects in the prior art, the present disclosure provides a trailer connecting mechanism and a trailer, with an aim to solve the technical problem that trailer connecting mechanisms of the prior art cannot adapt to different types of power-assisted vehicles.

To achieve the above objective, the present disclosure adopts the following technical solution:

In a first aspect, a trailer connecting mechanism is provided in an example of the present disclosure, including: a first connecting assembly, a connecting member movably connected to the first connecting assembly, and a second connecting assembly connected to the connecting member; and the first connecting assembly is further connected to a trailer, and the second connecting assembly is further connected to a power-assisted vehicle; and the second connecting assembly is adjustably arranged relative to the connecting member.

The second connecting assembly includes: a quick-lock member, a threaded rod fixedly connected to the quick-lock member, and a fixing base connected to the threaded rod in a sleeved manner, where the threaded rod may be adjustably fixed at any position relative to the fixing base.

External threads are arranged on an outer wall of the threaded rod, and the fixing base is internally provided with a threaded hole, where the threaded rod is threadedly connected to the threaded hole.

A first nut is threadedly connected to an outer end portion of the threaded rod, and the first nut is located outside the fixing base.

The quick-lock member includes: a clamping block hingedly opened and closed, a screw rod that penetrates through the clamping block, and a movable handle connected to a capped end of the screw rod, where the movable handle is provided with a cam portion that matches the clamping block, and when the clamping block is closed, a connecting clamping opening is formed.

The clamping block includes a front clamping plate, a rear clamping plate, and a rotating shaft, where one end of the front clamping plate is hinged to one end of the rear clamping plate through the rotating shaft, a plurality of through holes are formed at hinge positions of the front clamping plate or the rear clamping plate, the rotating shaft is adjustably inserted into the through hole, a waist-shaped hole is further formed at opening-closing ends of the front clamping plate and the rear clamping plate, and the screw rod is adjustably connected to the waist-shaped hole.

The connecting member is provided with two connecting ends located on an opening side thereof, as well as a connecting vertex linearly equidistant from both the connecting ends, where the first connecting assembly is connected to the connecting vertex, and one of the second connecting assemblies is arranged at either of the connecting ends.

The first connecting assembly includes: a locking member, a movable member, a clamping member, a screw rod assembly, and a rotating shaft member, where the screw rod assembly sequentially penetrates through middles of the locking member, the movable member, and the clamping member, the rotating shaft member penetrates through the clamping member, and the connecting member is movably connected to the rotating shaft member.

A first gap is reserved between the connecting member and the clamping member, such that the connecting member moves vertically relative to the clamping member.

The screw rod assembly includes: a connecting rod and a nut threadedly connected to the connecting rod, and a second gap is formed between an end portion of the connecting rod close to the rotating shaft member and the connecting vertex, where a width of the second gap is less than a height of the nut.

In a second aspect, a trailer is provided in an example of the present disclosure, including the trailer connecting mechanism as described in any one of the preceding examples and a trailer body connected to the trailer connecting mechanism.

In the trailer connecting mechanism of the present disclosure, the second connecting assembly and the connecting member are threadedly connected, which achieves an adjustable connection between the second connecting assembly and the power-assisted vehicle. Additionally, the first connecting assembly and the connecting member are movably connected in a rotational and vertical direction, which enhances flexibility of movement and following between the main body of the trailer and the trailer connecting mechanism, such that the power-assisted vehicle tows the trailer in a more comfortable manner.

The above description is merely a summary of the technical solution of the present disclosure. In order to have a clearer understanding of the technical means of the present disclosure, the content of the specification may be referred to for implementation. To make the above and other objectives, features and advantages of the present disclosure apparent and understandable, the following preferred examples are detailed as follows.

Figure 1:
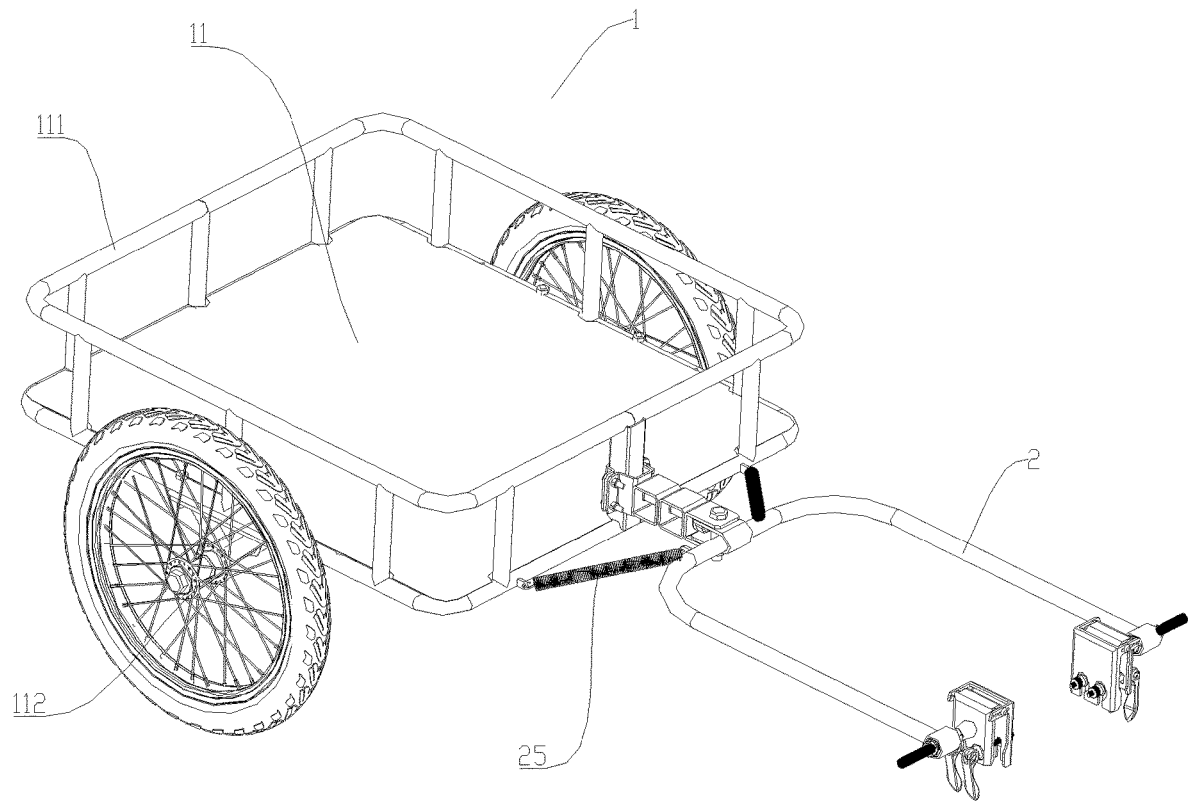
FIG. 1 is a schematic diagram of an overall structure of a trailer according to an example of the present disclosure.
Figure 2:
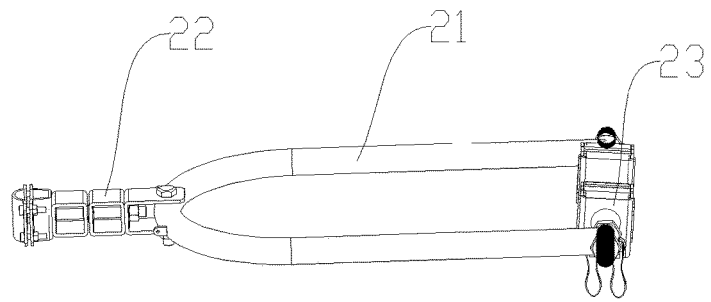
FIGS. 2-3 are schematic structural diagrams of different views of a trailer connecting mechanism according to an example of the present disclosure.
Figure 3:
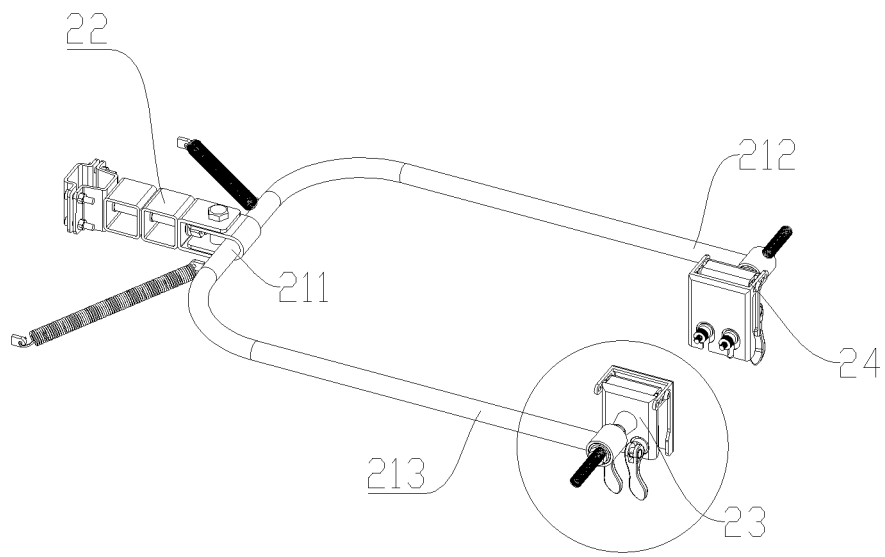
Figure 4:
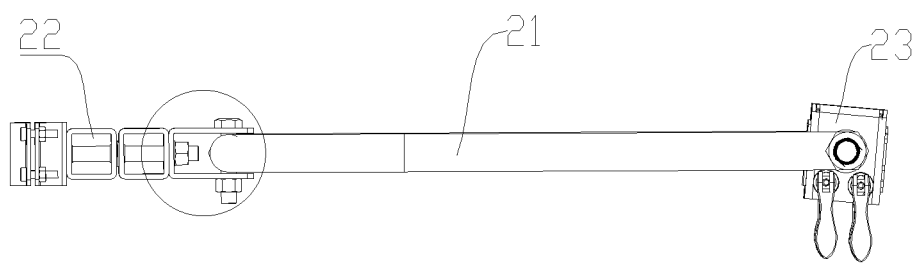
FIG. 4 is a schematic diagram of a side structure of a trailer connecting mechanism according to an example of the present disclosure.
Figure 5:
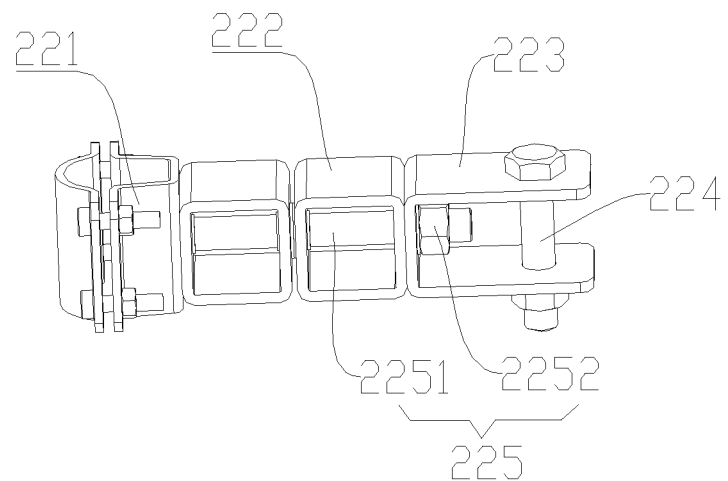
FIGS. 5 and 6 are schematic structural diagrams of different views of a first connecting assembly of a trailer connecting mechanism according to an example of the present disclosure.
Figure 6:
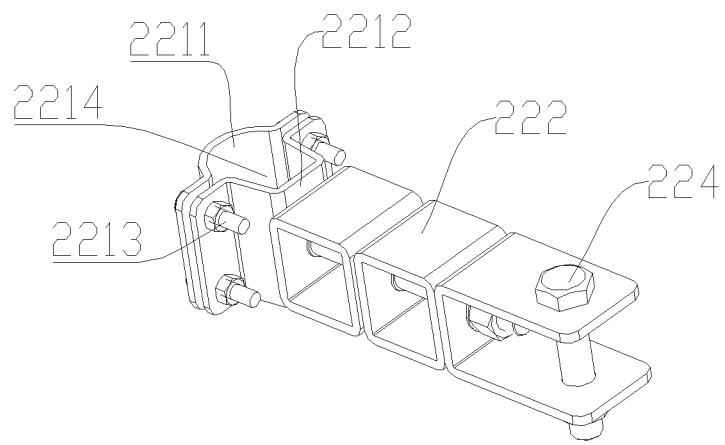

REFERENCE NUMERALS IN THE FIGURES trailer 1, trailer connecting mechanism 2, trailer body 11, frame 111, wheel 112, elastic member 25, first gap 201, second gap 202, connecting member 21, connecting vertex 211, connecting end 212, connecting end 213, first connecting assembly 22, locking member 221, front locking plate 2211, rear locking plate 2212, screw-nut assembly 2213, connecting hole 2214, movable member 222, clamping member 223, rotating shaft member 224, screw rod assembly 225, connecting rod 2251, nut 2252, second connecting assembly 23, second connecting assembly 24, fixing base 231, threaded rod 232, quick-lock member 233, clamping block 2331, screw rod 2332, movable handle 2333, connecting clamping opening 2334, outer sleeve 2313, inner sleeve 2314, outer nut 2312, inner nut 2311, transverse sleeve 214, front clamping plate 23311, rear clamping plate 23312, hinge position 23313, hinge position 23316, rotating shaft 23314, through hole 23315, and waist-shaped hole 23310.

DETAILED DESCRIPTIONS OF THE EMBODIMENTS

In order to make objectives, technical solutions and advantages of the present disclosure clearer, the present disclosure will be described in further detail below with reference to the accompanying drawings and specific embodiments.

The technical solutions in the examples of the present disclosure will be clearly and completely described below in combination with the accompanying drawings in the examples of the present disclosure. Apparently, the examples described are merely some rather than all of the examples of the present disclosure. Based on the examples of the present disclosure, all other examples obtained by those skilled in the art without making creative efforts shall fall within the protection scope of the present disclosure.

In the description of the present disclosure, it is to be understood that the terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", etc. indicate azimuthal or positional relations based on those shown in the accompanying drawings only for ease of description of the present disclosure and for simplicity of description, and are not intended to indicate or imply that the referenced device or element must have a particular orientation and be constructed and operative in a particular orientation, and thus may not be interpreted as a limitation on the present disclosure.

Furthermore, the terms "first" and "second" are merely for the purpose of description, and cannot be construed as indicating or implying relative importance or implicitly specifying the number of technical features indicated. Thus, a feature defined with "first" and "second" may explicitly or implicitly include one or more of the features. In the description of the present disclosure, "a plurality of" means two or more, unless expressly specified otherwise.

In the present disclosure, unless otherwise explicitly specified and defined, the terms "mounting", "connecting", "connection", "fixing", etc. should be understood in a broad sense, for example, they may be a fixed connection, a detachable connection, or an integrated connection; may be a mechanical connection, or an electrical connection; may be a direct connection, or an indirect connection via an intermediate medium; and may be communication inside two elements, or an interactive relation between two elements. For those skilled in the art, the specific meanings of the terms described above in the present disclosure may be interpreted according to specific circumstances.

In the present disclosure, unless otherwise expressly stated and defined, a first feature being "above" or "below" a second feature may include the first and second features being in direct contact or that the first and second features being not in direct contact but being in contact by means of additional features between the first and second features. In addition, the first feature being "over", "above" and "on the top of" the second feature includes that the first feature is over and above the second feature, or simply means that the level of the first feature is higher than that of the second feature. The first feature being "under", "below" and "at the bottom of" the second feature includes that the first feature is under and below the second feature, or simply means that the level of the first feature is lower than that of the second feature.

In the description of the present description, the description of reference terms such as "one embodiment", "some embodiments", "example", "specific example" or "some examples" means that specific features, structures, materials or characteristics described in combination with the embodiment or example are included in at least one embodiment or example of the present disclosure. In the present description, the schematic description of the above terms should not be construed as necessarily referring to the same embodiment or example. Moreover, the specific features, structures, materials or characteristics described may be combined in a suitable manner in any one or more embodiments or examples.

With the continuous development of the camping economy, an increasing number of users prefer using small trailers to transport food and outdoor supplies. Trailers of the prior art are typically designed to be movable in a way of hand pulling by users, and some trailers can be connected to power-assisted vehicles for towing movement. However, a connection structure between a trailer of the prior art and a power-assisted vehicle is fixed, such that the connection structure of a trailer is incompatible with different types of power-assisted vehicles, which significantly reduces usability. Therefore, in view of the above situation, a trailer connecting mechanism 2 is provided in this example.

With reference to FIGS. 1-10, a trailer connecting mechanism 2 is disclosed in this example, and the trailer connecting mechanism 2 designed for trailers is configured to connect a trailer 1 to a power-assisted vehicle, which causes the trailer 1 to follow the power-assisted vehicle to move easily, where the power-assisted vehicle includes an electric bike, a conventional bicycle, or the like.

The trailer connecting mechanism 2 includes: a first connecting assembly 22, a connecting member 21 movably connected to the first connecting assembly 22, and a second connecting assembly 23 connected to the connecting member 21; and the first connecting assembly 22 is further connected to the trailer 1, and the second connecting assembly 23 is further connected to the power-assisted vehicle (not shown in the figure). The second connecting assembly 23 is adjustably arranged relative to the connecting member 21. Since the power-assisted vehicle is connected to the second connecting assembly 23, when the second connecting assembly 23 is adjustably arranged relative to the connecting member 21, a distance between the power-assisted vehicle and the trailer connecting mechanism 2 may be accordingly adjusted.

In this example, the second connecting assembly 23 may be connected to a seat support rod of the power-assisted vehicle or a rear column of a frame of the power-assisted vehicle, and the rear column is a U-shaped support structure connecting a rear wheel axle to the frame. For illustrative purposes, the trailer connecting mechanism 2 is connected to the rear column of the power-assisted vehicle in this example, widths of U-shaped structures of rear columns of different power-assisted vehicles vary, and the connecting member 21 is typically made of a rigid material, which causes movement space to be relatively limited. Therefore, the second connecting assembly 23 in this example may be adjusted relative to the connecting member 21, such that an anteroposterior position of the second connecting assembly 23 may be changed to adapt to varying rear column spacings of different models of power-assisted vehicles. In this example, the second connecting assembly 23 may be adjusted relative to the connecting member 21, a spacing in a direction perpendicular to a towing direction of the trailer is adjusted, and the spacing refers to a lateral spacing between the trailer connecting mechanism 2 and the power-assisted vehicle. It is to be understood that in other examples, a spacing between the trailer and the power-assisted vehicle in the towing direction may be further adjusted by adjusting the connecting member 21 and the second connecting assembly 24.

With reference to FIGS. 7 and 8 again, the second connecting assembly 23 includes: a quick-lock member 233, a threaded rod 232 fixedly connected to the quick-lock member 233, and a fixing base 231 connected to the threaded rod 232 in a sleeved manner, where the fixing base 231 is further connected to the connecting member 21, and the threaded rod 232 may be adjustably fixed at any position relative to the fixing base 231. In this example, two second connecting assemblies 23 are arranged and symmetrically distributed on the connecting member 21, and a space for accommodating a rear wheel and related structures of the power-assisted vehicle is formed therebetween. As different models of power-assisted vehicles have varying spaces for accommodating rear wheels and related structures, the trailer connecting mechanism 2 needs to have width adjustment functions. The threaded rod 232 may be adjustably fixed at any position relative to the fixing base 231, and the connecting member 21 is connected to the power-assisted vehicle through the second connecting assembly 23. Therefore, the adjustable structure design achieves spatial adaptation between the connecting member 21 and the power-assisted vehicle, thereby enhancing compatibility with different models of power-assisted vehicles and improving universality. The threaded rod 232 may be adjustably fixed at any position relative to the fixing base 231 through various solutions.

In this example, the fixing base 231 includes: an outer sleeve 2313 sleeved on the threaded rod 232, an outer nut 2312 located outside the outer sleeve 2313 and threadedly connected to the threaded rod 232, an inner sleeve 2314 sleeved on the threaded rod 232, and an inner nut 2311 located inside the inner sleeve 2314 and threadedly connected to the threaded rod 232.

In other examples, the threaded rod 232 is adjustably fixed to the fixing base 231 at various positions alternatively through a structure where a connecting rod and a sleeve cooperate with each other, where the connecting rod is provided with a plurality of connecting grooves, the sleeve is provided with a plurality of connecting holes, and a screw is used for radially threaded connection with the connecting hole and the connecting groove.

Figure 8:
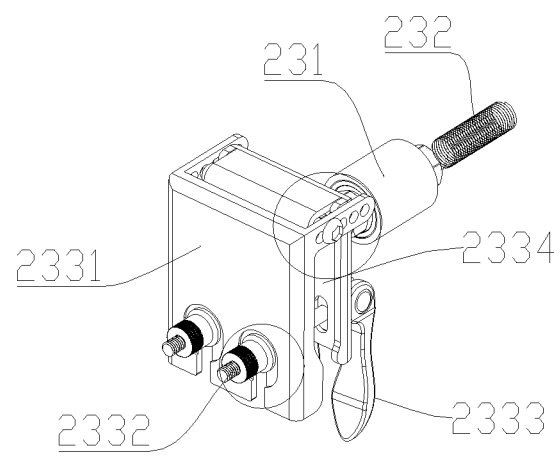

As illustrated in FIG. 8, the quick-lock member 233 includes: a clamping block 2331 hingedly opened and closed, a screw rod 2332 that penetrates through the clamping block 2331, and a movable handle 2333 connected to a capped end of the screw rod 2332, where the movable handle 2333 is provided with a cam portion that matches the clamping block 2331. When the clamping block 2331 is closed, a connecting clamping opening 2334 is formed, and the connecting clamping opening 2334 is configured for inserted connection with a rear seat connecting column or a frame support column of the power-assisted vehicle. Specifically, the screw rod 2332 is connected to one side of the clamping block 2331 away from a hinge position, and when the screw rod 2332 is loosened, the connecting clamping opening 2334 may be opened to facilitate connection with the power-assisted vehicle. After locking the screw rod 2332, the movable handle 2333 provided with the cam portion is flipped, such that the cam portion abuts against a surface of the clamping block 2331, and the movable handle 2333 locks the screw rod 2332 and is fixed on the clamping block 2331.

With reference to FIGS. 7, 8, 11, and 12 again, the clamping block 2331 includes a front clamping plate 23311, a rear clamping plate 23312, and a rotating shaft 23314, where one end of the front clamping plate 23311 is hinged to one end of the rear clamping plate 23312 through the rotating shaft 23314, a plurality of through holes 23315 are formed at hinge positions 23313 and 23316 of the front clamping plate 23311 or the rear clamping plate 23312, the rotating shaft 23314 is adjustably inserted into the through hole 23315, a waist-shaped hole 23310 is further formed at opening-closing ends of the front clamping plate 23311 and the rear clamping plate 23312, and the screw rod 2332 is adjustably connected to the waist-shaped hole 23310.

The front clamping plate 23311 and the rear clamping plate 23312 are L-shaped plates that are oriented oppositely, end plates of the L-shaped plates are hinged portions, and the rotating shaft 23314 penetrates through the through hole 23315. On the one hand, the front clamping plate 23311 and the rear clamping plate 23312 rotate around the rotating shaft 23314 for opening and closing, and on the other hand, and the rotating shaft 23314 is adjustably inserted into one of the through holes 23315 sequentially to change a width of the connecting clamping opening 2334 formed between the front clamping plate 23311 and the rear clamping plate 23312, so as to adapt to support columns of different bicycles. Partially flat support columns of power-assisted vehicles have larger widths, and therefore the waist-shaped hole 23310 is further formed at the opening-closing ends of the front clamping plate 23311 and the rear clamping plate 23312, and the screw rod 2332 is inserted into different positions of the waist-shaped hole 23310 to change a longitudinal width of the connecting clamping opening 2334, so as to adapt to various flat structures of support columns.

With reference to FIG. 3 again, the fixing base 231 is connected to the connecting member 21, and the connecting member 21 is provided with two connecting ends 212 and 213 located on an opening side thereof, as well as a connecting vertex 211 linearly equidistant from both the connecting ends 212 and 213, where the first connecting assembly 22 is connected to the connecting vertex 211, and one of the second connecting assemblies 23 and 24 is arranged at either of the connecting ends 212 and 213. That is, a main body of the connecting member 21 may be of any structure or shape, and an isosceles triangle is formed by the connecting vertex 211 and the two connecting ends 212 and 213 with the connecting vertex 211 as a vertex. A notch is formed between the connecting ends 212 and 213, a rear wheel portion of the power-assisted vehicle is located inside the notch when connected to the power-assisted vehicle, and a clearance space for the power-assisted vehicle is formed during connection. The second connecting assembly 23 is connected to a stand column on one side of the frame, and the second connecting assembly 24 is connected to a stand column on the other side of the frame. When the trailer connecting mechanism 2 is connected to the seat support rod of the power-assisted vehicle, only one second connecting assembly needs to be arranged on the connecting member 21.

Figure 7:
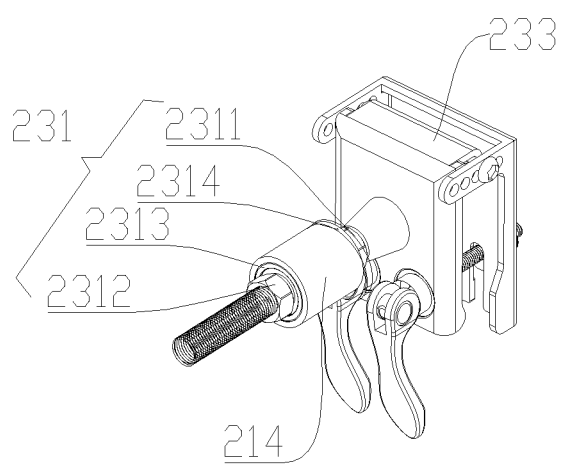
FIGS. 7 and 8 are schematic structural diagrams of different views of a second connecting assembly of a trailer connecting mechanism according to an example of the present disclosure.

In this example, the connecting member 21 is a U-shaped tube or rod. In other examples, the connecting member 21 is alternatively of an isosceles triangle or any structure where an isosceles triangle is formed by the connecting vertex 211 and the two connecting ends 212 and 213. The connecting vertex 211 of the connecting member 21 as a U-shaped tube or rod is a U-shaped top endpoint, and the connecting ends 212 and 213 are U-shaped bottom endpoints. Transverse sleeves 214 are arranged at the connecting ends 212 and 213 respectively, and the transverse sleeve 214 is sleeved on the threaded rod 232 and fixed by the fixing base 231. With reference to FIG. 7, the transverse sleeve 214 is approximately perpendicular to a long arm of the connecting member 21 as a U-shaped tube, the transverse sleeve 214 is sleeved on the threaded rod 232, the outer sleeve 2313 and the inner sleeve 2314 are inserted into a cavity of the transverse sleeve 214 from openings on both sides of the transverse sleeve 214, and opposing ends of the outer sleeve 2313 and the inner sleeve 2314 abut against each other. An overall length of the outer sleeve 2313 and the inner sleeve 2314 is slightly greater than a length of the transverse sleeve 214, such that the transverse sleeve 214 rotates along the fixing base 231. To adjust a spacing of the quick-lock member 233, the inner nut 2311 and the outer nut 2312 are loosened, the outer sleeve 2313 and the inner sleeve 2314 are repositioned relative to the transverse sleeve 214, and the outer nut 2312 and the inner nut 2311 are re-tightened after adjustment.

With reference to FIGS. 5 and 6 again, the first connecting assembly 22 includes: a locking member 221, a movable member 222, a clamping member 223, a screw rod assembly 225, and a rotating shaft member 224, where the screw rod assembly 225 sequentially penetrates through middles of the locking member 221, the movable member 222, and the clamping member 223, the rotating shaft member 224 penetrates through the clamping member 223, and the connecting member 21 is movably connected to the rotating shaft member 224. The screw rod assembly 225 transversely penetrates through the middles of the locking member 221, the movable member 222, and the clamping member 223, and the rotating shaft member 224 longitudinally penetrates through the clamping member 223.

The locking member 221 includes a front locking plate 2211 and a rear locking plate 2212 that are reversely butt-jointed with each other, and a screw-nut assembly 2213 that detachably connects the front locking plate 2211 and the rear locking plate 2212. When the front locking plate 2211 and the rear locking plate 2212 are fixedly connected by the screw-nut assembly 2213, a connecting hole 2214 is formed therebetween, and the connecting hole 2214 is configured for inserted connection with a stand column of the trailer 1.

The movable member 222 is a cuboid-shaped key block with two opposing faces of an opening structure, and one or more movable members 222 may be arranged and all penetrate through the screw rod assembly 225. When the locking member 221 and the clamping member 223 rotate around the screw rod assembly 225, the movable member 222 moves with the screw rod assembly 225, such that the locking member 221 and the clamping member 223 rotatably move more smoothly.

With reference to FIG. 9 again, a first gap 201 is reserved between the connecting member 21 and the clamping member 223, such that the connecting member 21 moves vertically relative to the clamping member 223. Specifically, the connecting vertex 211 of the connecting member 21 penetrates through the rotating shaft member 224, the clamping member 223 is a U-shaped member, and the rotating shaft member 224 penetrates through an opening of the U-shaped member. The connecting vertex 211 of the connecting member 21 extends into the opening of the U-shaped member and rotates laterally with the rotating shaft member 224 in a horizontal plane. The first gap 201 is reserved between the clamping member 223 and an outer wall of the connecting vertex 211 of the connecting member 21, and therefore the connecting member 21 may further move vertically along the rotating shaft member 224. The purpose of reserving the first gap 201 between the connecting member 21 and the clamping member 223 is as follows: when the trailer 1 is connected to the power-assisted vehicle through the trailer connecting mechanism 2, and when the power-assisted vehicle and the trailer 1 move on a bumpy road, height differences exist therebetween, and in this case, the first gap 201 between the connecting member 21 and the clamping member 223 better adapts to the bumpy road and reduces interference from the height differences.

Figure 9:
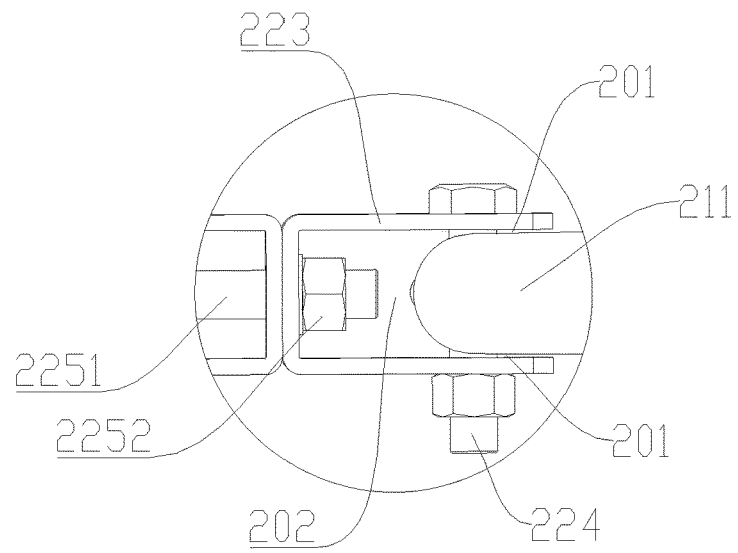
FIG. 9 is a schematic diagram of a partially enlarged structure in FIG. 4.
Figure 10:
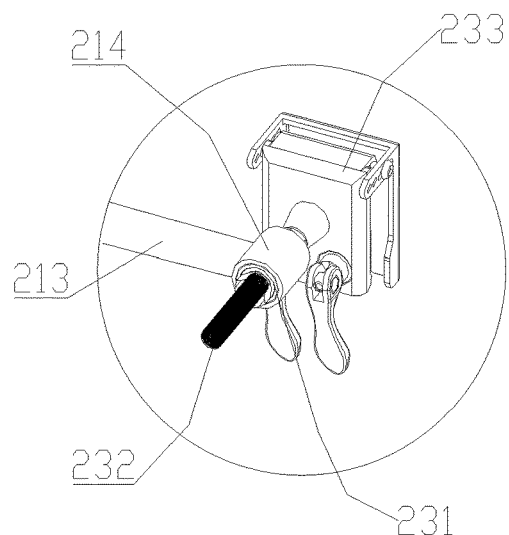
FIG. 10 is a schematic diagram of a partially enlarged structure in FIG. 3.
Figure 11:
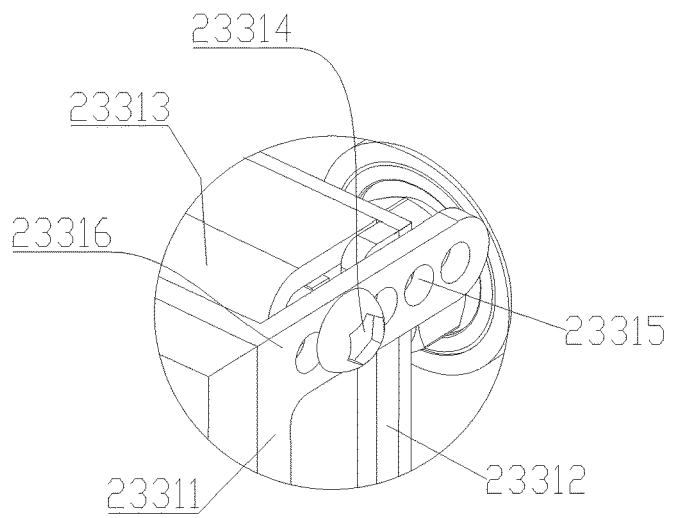
FIG. 11 is a schematic diagram of a partially enlarged structure in FIG. 7.
Figure 12:
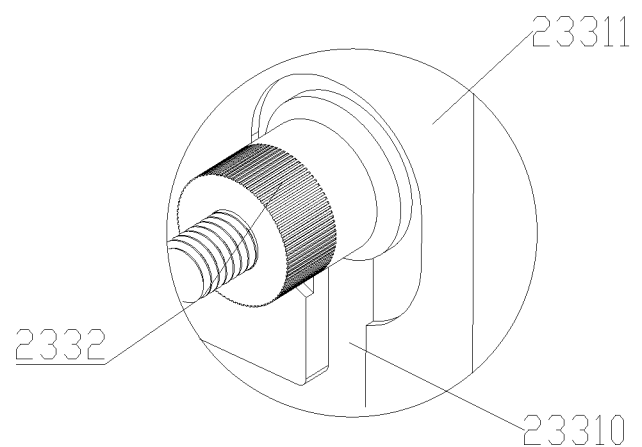
FIG. 12 is a schematic diagram of another partially enlarged structure in FIG. 7.

Further, the screw rod assembly 225 includes: a connecting rod 2251 and a nut 2252 threadedly connected to the connecting rod 2251, and a second gap 202 is formed between an end portion of the connecting rod 2251 close to the rotating shaft member 224 and the connecting vertex 211, where a width of the second gap 202 is less than a height of the nut 2252. As shown in FIG. 9, vibrations of the trailer connecting mechanism 2 during long-term use may cause the nut 2252 to loosen and disengage. To prevent the nut 2252 from disengagement, a height of the second gap 202 is designed to be slightly less than a height of the nut 2252, and the connecting vertex 211 is used to restrict the nut 2252 to prevent complete disengagement from the connecting rod 2251.

With reference to FIG. 1 again, a trailer 1 is further provided in this example, and the trailer 1 includes a trailer body 11 and a trailer connecting mechanism 2 connected to the trailer body 11, where the trailer connecting mechanism 2 employs the above structure. The trailer body 11 includes a frame 111 and wheels 112 connected to a bottom of the frame 111, and a front edge of the frame 111 is connected to the locking member 221 of the second connecting assembly 22.

When the power-assisted vehicle tows the trailer 1 to move along a non-linear path, a turning angle exists between the trailer 1 and the power-assisted vehicle, and a too large turning angle affects normal movement. Therefore, two elastic members 25 are arranged between the connecting member 21 and a front side face of the frame 111, one end of either of the elastic members 25 is connected to the connecting member 21, and the other end thereof is connected to the frame 111. An approximately isosceles triangle is formed by the two elastic members 25 and a front side of the frame 111, such that rapid elastic resetting is enabled after turning, and a continuous tracking state is maintained.

In the trailer connecting mechanism 2 and the trailer 1 in this example, the second connecting assembly 23 and the connecting member 21 are threadedly connected, which achieves an adjustable connection between the second connecting assembly 23 and the power-assisted vehicle. Additionally, the first connecting assembly 22 and the connecting member 21 are movably connected in a rotational and vertical direction, and the second connecting assembly 23 and the power-assisted vehicle are movably connected, which enhances flexibility of movement and following between the main body of the trailer and the trailer connecting mechanism, such that the power-assisted vehicle tows the trailer in a more comfortable manner.

The above examples are only intended to further illustrate the technical content of the present disclosure and facilitate understanding by the readers, but it does not mean that the embodiments of the present disclosure are only limited thereto. Any technical extension or recreation made based on the present disclosure falls within the scope of protection of the present disclosure. The scope of protection of the present disclosure shall be governed by the appended claims.

What is claimed is:

1. A trailer connecting mechanism, comprising:
a first connecting assembly, a connecting member movably connected to the first connecting assembly, and a second connecting assembly connected to the connecting member;
the first connecting assembly is constructed to be further connected to a trailer, and the second connecting assembly is constructed to be further connected to a power-assisted vehicle; and the second connecting assembly is adjustably arranged relative to the connecting member;
wherein the second connecting assembly comprises: a quick-lock member, a threaded rod fixedly connected to the quick-lock member, and a fixing base connected to the threaded rod in a sleeved manner, wherein the threaded rod may be adjustably fixed at any position relative to the fixing base; and
wherein the quick-lock member comprises: a clamping block hingedly to be opened and closed, a screw rod that penetrates through the clamping block, and a movable handle connected to a capped end of the screw rod, wherein the movable handle is provided with a cam portion that matches the clamping block, and when the clamping block is closed, a connecting clamping opening is defined.

2. A trailer connecting mechanism, comprising:
a first connecting assembly, a connecting member movably connected to the first connecting assembly, and a second connecting assembly connected to the connecting member;
the first connecting assembly is constructed to be further connected to a trailer, and the second connecting assembly is constructed to be further connected to a power-assisted vehicle; and the second connecting assembly is adjustably arranged relative to the connecting member;
wherein the second connecting assembly comprises: a quick-lock member, a threaded rod fixedly connected to the quick-lock member, and a fixing base connected to the threaded rod in a sleeved manner, wherein the threaded rod may be adjustably fixed at any position relative to the fixing base; and
wherein the fixing base comprises: an outer sleeve sleeved on the threaded rod, an outer nut located outside the outer sleeve and threadedly connected to the threaded rod, an inner sleeve sleeved on the threaded rod, and an inner nut located inside the inner sleeve and threadedly connected to the threaded rod.

3. The trailer connecting mechanism according to claim 2, wherein a transverse sleeve is further arranged on the connecting member, and the transverse sleeve is sleeved on outer walls of the outer sleeve and the inner sleeve.

4. A trailer connecting mechanism, comprising:
a first connecting assembly, a connecting member movably connected to the first connecting assembly, and a second connecting assembly connected to the connecting member;
the first connecting assembly is constructed to be further connected to a trailer, and the second connecting assembly is constructed to be further connected to a power-assisted vehicle;
the second connecting assembly is adjustably arranged relative to the connecting member;
the second connecting assembly comprises: a quick-lock member, the quick-lock member comprises: a clamping block to be hingedly opened and closed and a screw rod that penetrates through the clamping block; and
the clamping block comprises a front clamping plate, a rear clamping plate, and a rotating shaft, wherein one end of the front clamping plate is hinged to one end of the rear clamping plate through the rotating shaft, a plurality of through holes are formed at hinge positions of the front clamping plate or the rear clamping plate, the rotating shaft is adjustably inserted into a through hole of the plurality of through holes, a waist-shaped hole is further formed at opening-closing ends of the front clamping plate and the rear clamping plate, and the screw rod is adjustably connected to the waist-shaped hole.

5. The trailer connecting mechanism according to claim 4, wherein the connecting member is provided with two connecting ends located on an opening side thereof, as well as a connecting vertex linearly equidistant from both the connecting ends, wherein the first connecting assembly is connected to the connecting vertex, and one of the second connecting assemblies is arranged at either of the connecting ends; and the first connecting assembly comprises: a locking member, a movable member, a clamping member, a screw rod assembly, and a rotating shaft member, wherein the screw rod assembly sequentially penetrates through middles of the locking member, the movable member, and the clamping member, the rotating shaft member penetrates through the clamping member, and the connecting member is movably connected to the rotating shaft member.

6. The trailer connecting mechanism according to claim 5, wherein a first gap is reserved between the connecting member and the clamping member, such that the connecting member moves vertically relative to the clamping member.

7. The trailer connecting mechanism according to claim 5, wherein the screw rod assembly comprises: a connecting rod and a nut threadedly connected to the connecting rod, and a second gap is formed between an end portion of the connecting rod close to the rotating shaft member and the connecting vertex, wherein a width of the second gap is less than a height of the nut.

8. A trailer, comprising the trailer connecting mechanism according to claim 1 and a trailer body connected to the trailer connecting mechanism.

\* \* \* \* \*